United States Patent
Pourseyed et al.

(10) Patent No.: US 8,744,539 B2
(45) Date of Patent: Jun. 3, 2014

(54) METHOD AND APPARATUS FOR CONTROLLING RADIATION CHARACTERISTICS OF TRANSMITTER OF WIRELESS DEVICE IN CORRESPONDENCE WITH TRANSMITTER ORIENTATION

(75) Inventors: Behrouz Pourseyed, Richmond (CA); Vincent Maddock Smith, Langley (CA); Ying Wang, Richmond (CA); Kevin Alexander Goodfellow, Delta (CA); Colin Lee, Port Coquitlam (CA)

(73) Assignee: NETGEAR, Inc., San Jose, CA (US)

( * ) Notice: Subject to any disclaimer, the term of this patent is extended or adjusted under 35 U.S.C. 154(b) by 145 days.

(21) Appl. No.: 12/719,781

(22) Filed: Mar. 8, 2010

(65) Prior Publication Data

US 2010/0279751 A1     Nov. 4, 2010

Related U.S. Application Data

(60) Provisional application No. 61/174,944, filed on May 1, 2009.

(51) Int. Cl.
| | |
|---|---|
| *H01Q 21/00* | (2006.01) |
| *H04M 1/38* | (2006.01) |
| *H01Q 1/24* | (2006.01) |
| *H03C 1/62* | (2006.01) |
| *H04B 1/38* | (2006.01) |

(52) U.S. Cl.
USPC ........... 455/575.7; 343/893; 455/556.1; 455/115; 455/90.1; 343/702

(58) Field of Classification Search
USPC ............... 455/575.7, 90.1; 343/702
See application file for complete search history.

(56) References Cited

U.S. PATENT DOCUMENTS

| | | | |
|---|---|---|---|
| 4,647,871 A | | 3/1987 | Turner, Jr. |
| 5,541,609 A | * | 7/1996 | Stutzman et al. ............. 343/702 |
| 5,815,820 A | | 9/1998 | Kiem et al. |
| 6,195,562 B1 | | 2/2001 | Pirhonen et al. |
| 6,380,897 B1 | | 4/2002 | Shaw et al. |
| 6,380,910 B1 | * | 4/2002 | Moustakas et al. ........... 343/893 |
| 6,456,856 B1 | | 9/2002 | Werling et al. |
| 6,484,015 B1 | | 11/2002 | Aleiner et al. |
| 6,710,651 B2 | | 3/2004 | Forrester |
| 6,919,861 B2 | | 7/2005 | Miyano et al. |
| 6,934,515 B2 | | 8/2005 | Wallach |
| 6,941,117 B2 | * | 9/2005 | Ide ............................... 455/90.1 |
| 7,071,776 B2 | | 7/2006 | Forrester et al. |
| 7,146,139 B2 | * | 12/2006 | Nevermann ................ 455/115.1 |
| 7,164,315 B2 | | 1/2007 | Camnitz et al. |

(Continued)

OTHER PUBLICATIONS

Caimi, et al., "Antenna Design for Improved Efficiency and Reduced SAR", SkyCross, Apr. 2001, pp. 1-4.

*Primary Examiner* — Claire X Pappas
*Assistant Examiner* — Ngan Pham Lu
(74) *Attorney, Agent, or Firm* — Boyle Fredrickson, S.C.

(57) ABSTRACT

The invention provides an apparatus and a corresponding method for controlling radiation characteristics of a transmitter of a wireless device. The wireless device includes a transmitting portion that includes one or more antennas that are characterized by one or more radiation patterns. The wireless device further comprises a sensor system for determining an orientation of the transmitting portion and a control system that is operatively coupled to the sensor system and configured to control the supply of power to each antenna depending on the orientation of the transmitting portion.

26 Claims, 9 Drawing Sheets

(56) References Cited

U.S. PATENT DOCUMENTS

| | | |
|---|---|---|
| 7,212,164 B2 | 5/2007 | Miyano et al. |
| 7,499,722 B2 * | 3/2009 | McDowell et al. ............ 455/522 |
| 2002/0011828 A1 | 1/2002 | Wallach |
| 2002/0125945 A1 | 9/2002 | Taylor |
| 2005/0093624 A1 * | 5/2005 | Forrester et al. .............. 330/129 |
| 2005/0113125 A1 | 5/2005 | Kang |
| 2005/0119035 A1 | 6/2005 | Miyano et al. |
| 2007/0111681 A1 | 5/2007 | Alberth et al. |
| 2007/0259689 A1 * | 11/2007 | Kutaragi ..................... 455/556.1 |
| 2008/0018543 A1 * | 1/2008 | Baliarda et al. ................ 343/702 |
| 2009/0121945 A1 * | 5/2009 | Tani et al. ...................... 343/702 |
| 2010/0053024 A1 * | 3/2010 | Andersson et al. ............ 343/893 |
| 2010/0137042 A1 * | 6/2010 | Na et al. ....................... 455/575.5 |

* cited by examiner

METHOD AND APPARATUS FOR CONTROLLING RADIATION CHARACTERISTICS OF TRANSMITTER OF WIRELESS DEVICE IN CORRESPONDENCE WITH TRANSMITTER ORIENTATION

FIELD OF THE INVENTION

The present invention pertains in general to control of electromagnetic radiation emitted from wireless devices and in particular to the control of radiation characteristics in light of transmitter orientation.

BACKGROUND

The evolution of wireless devices has dramatically increased the availability of voice and data services and the adoption of wireless services. This has created a significant demand for improved wireless communication terminals and in turn has complicated the design considerations for transmitters and antennas of wireless devices.

Until the advent of mobile handsets and portable wireless terminals, antenna design was often based purely on technical radio specifications such as gain, bandwidth, and polarization, for example. Demand for reduced size, increased power efficiency and the requirement to meet ever more stringent radiation emission regulation requirements have emphasized a number of additional design aspects. Specifically antenna efficiency and a reduction of user irradiation by a wireless device have become important design considerations for transmitter stages of wireless devices.

Wireless devices are subject to Specific Absorption Rate (SAR) limits in many countries to ensure that device users are not exposed to unacceptable irradiation levels. Regulations may prescribe different SAR exposure limits for different regions of the body. SAR is determined by the radiation absorbed by a person and is typically defined in terms of power absorbed per mass of tissue. SAR can depend on a number of aspects including, for example, the position and orientation of the wireless device relative to the person, the field emission characteristics of the wireless device, the transmitting power and frequency, as well as ambient elements that can interact with the radiation emitted by the wireless device, and possibly other effects such as effects related to polarization of the radiation.

As the operating frequencies for wireless devices utilizing a given communication channel are usually fixed and cannot be independently controlled, known solutions to limit SAR build upon control of one or more of the remaining aspects. Although, depending on the wireless communication protocol, transmission power and consequently user irradiation may be lower in close proximity to wireless base stations, means to limit SAR even at full transmission power are required. Designing wireless devices with sufficiently high transmitter performance and sufficiently low SAR has become increasingly challenging. For example, transmission power must be sufficiently high to provide an acceptable signal-to-noise ratio (SNR) of the transmitted signal, and sufficiently low to result in an acceptable SAR.

Known solutions to limit SAR include distancing the device or at least the transmitter from the user, reducing transmission power with decreasing distance, and controlling the near-field radiation emission characteristics. According to some solutions, wireless devices may be preconfigured with an antenna system that can emit radiation only in predetermined directions in order to direct radiation primarily away from the user. SAR can also be reduced by reducing data transmission rate in combination with certain wireless communication protocols, for example. Some known solutions employ sophisticated distance sensing schemes and/or mechanisms in order to determine the distance between the wireless device and a user that in return require wireless devices that include complex hardware and/or software.

U.S. Pat. Nos. 5,541,609, 5,815,820, 6,195,562, 6,456,856, 6,919,861, 7,146,139, 7,499,722 and United States Patent Application Publication No. 2005/0113125 describe examples of known solutions. Some known solutions for controlling SAR, however, have become ineffective in meeting today's advanced regulatory requirements while others have become increasingly complex and therefore cost-ineffective.

Another example is U.S. Pat. No. 7,212,164, which describes a radio terminal device comprising an antenna and a tilt detector for detecting the tilt angle of the radio terminal device to notify an antenna characteristic switching section that performs a predetermined reconfiguration of the antenna to adjust, for example, antenna sensitivity and gain on the basis of the tilt angle. The patent, however, is concerned with effects of the tilt on antenna reception and fails to consider user irradiation.

Therefore there is a need for a solution that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for controlling radiation characteristics of a transmitter of a wireless device in correspondence with transmitter orientation. According to an aspect of the present invention there is provided a device for wireless communication comprising a transmitting portion including one or more antennas characterized by one or more radiation patterns, each radiation pattern defining dependence of intensity of electromagnetic radiation generated by an antenna on direction and distance from the transmitting portion; a sensor system for determining an orientation of the transmitting portion; and a control system operatively coupled to the sensor system and configured to selectively control power supplied to the one or more antennas in correspondence with the orientation of the transmitting portion; whereby the device provides predetermined control of intensity of electromagnetic radiation emitted from the transmitting portion in predetermined directions.

According to another aspect of the present invention, there is provided a method for controlling a wireless communication device comprising a transmitting portion including one or more antennas characterized by one or more radiation patterns, each radiation pattern defining dependence of intensity of electromagnetic radiation generated by an antenna on direction and distance from the transmitting portion, the method comprises; determining an orientation of the transmitting portion; selectively controlling power supplied to each antenna in correspondence with the orientation of the transmitting portion; whereby the method provides predetermined control of intensity of electromagnetic radiation emitted from the transmitting portion in predetermined directions.

DETAILED DESCRIPTION OF THE INVENTION

Definitions

Figure 1:
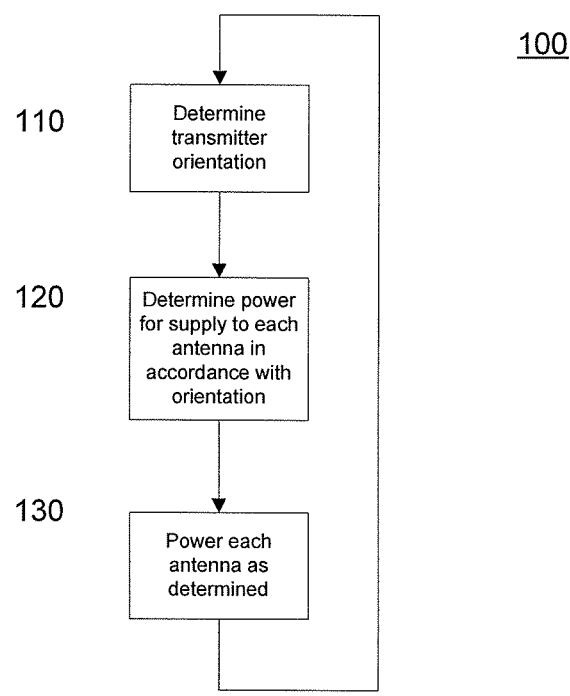
FIG. 1 illustrates a flow diagram of a method for controlling a transmitter of a wireless device according to embodiments of the invention.

The term "wireless device" is used to refer to an apparatus for analog and/or digital transmission and/or reception of signals for communication purposes via electromagnetic radiation that propagates, for example, through vacuum or a generally non-conductive medium to or from another apparatus. The wireless device may use signals that are formatted according to one or more of a number of communication systems including mobile phone networks such as cellular or satellite phone networks, or via WiFi, Wi-MAX™, Bluetooth™, Zigbee™, or other wireless communication systems, for example. A wireless device can comprise or be included in one or more of various forms of handheld/mobile or stationary communication and/or computing devices such as a radio, mobile phone, cellular phone, satellite phone, Smartphone, or a personal computer (PC) such as a desktop, notebook, tablet PC, personal digital assistant (PDA), game console, or computer peripherals such as a printer, camera, pointing device, or other apparatus, for example.

The term "transmitter" is used to refer to a portion of a wireless device that is used to emit electromagnetic radiation for communication purposes from the wireless device.

The term "radiation pattern" is used to refer to a dependence of intensity of electromagnetic radiation generated by an antenna on direction and distance from the antenna. For example, the near-field and/or far-field radiation patterns of an antenna can be graphically represented in a three-dimensional plot or in one or more two-dimensional plots, by plotting contour lines or surfaces representative of substantially constant radiation intensity or flux.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

During usage of a wireless device, its likely distances and orientations relative to a user vary typically within substantially predetermined ranges. In combination with this knowledge, user irradiation and SAR can therefore be estimated using the strength of the electromagnetic radiation generated by the wireless device and the intensity of the radiation emitted from the wireless device in specific directions. According to embodiments of the invention, likely ranges of user irradiation and therefore SAR can be limited by configuring a wireless device so that it enables control of the radiation pattern of the electromagnetic radiation emitted from the device.

According to some embodiments radiation characteristics of a wireless device, such as characteristics related to its antenna radiation patterns, can be controlled depending on the orientation of a transmitting portion of the wireless device. The transmitting portion includes one or more antennas that are characterized by one or more radiation patterns. The wireless device further includes a sensor system for determining an orientation of the transmitting portion, and a control system that is operatively coupled to the sensor system and configured to control the supply of power to each antenna depending on the orientation of the transmitting portion. The orientation determined by the sensor system may be, for example determined relative to a user, external reference system, internal reference system, or the like. The wireless device is configured to provide predetermined control of the strength of the emitted electromagnetic radiation in predetermined directions.

FIG. 1 illustrates a flow diagram of an example method 100 for controlling a transmitter of a wireless device according to some embodiments of the invention. The method includes determining 110 the orientation of the transmitter, determining 120 the amount of power to be supplied to each antenna depending on the orientation of the transmitter, and powering 130 each antenna as determined by controlling the power supplied to each antenna without exceeding the amount of power to be supplied to each antenna as determined in 120.

Figure 2A:
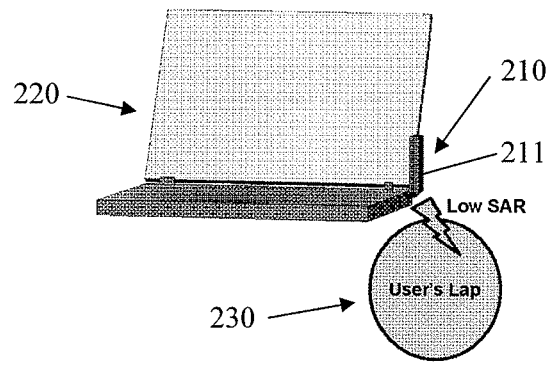
FIG. 2A illustrates a configuration of a wireless device according to an embodiment of the invention operatively connected to a notebook.
Figure 2B:
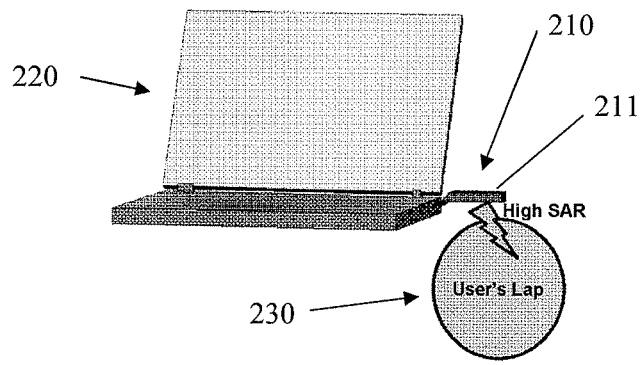
FIG. 2B illustrates another configuration of the wireless device illustrated in FIG. 2A operatively connected to a notebook.

FIG. 2A and FIG. 2B illustrate two different configurations of a wireless device 210 according to some embodiments of the invention. The wireless device 210 is operatively connected to a notebook 220. The wireless device comprises a transmitting portion 211 that is electrically and mechanically operatively connected to a connecting portion (not visible) in an articulated joint. The connecting portion may be configured with, for example, a universal serial bus interface connector, a PC Card or ExpressCard™ interface, or other interface as would be readily understood. FIG. 2A illustrates the wireless device 210 configured with the transmitting portion 211 in a substantially upright orientation and the connecting portion interconnected with a notebook 220.

The wireless device 210 may be configured to control emitted radiation depending on the orientation of the transmitting portion 211 in different ways depending on the embodiment. For example, if the wireless device 210 includes one antenna, the antenna may be configured to radiate electromagnetic radiation substantially sideways away from a lap of a user 230 as illustrated in FIG. 2A. The same wireless device may further be configured to reduce or completely suppress emission of electromagnetic radiation from the transmitting portion 211 if the transmitting portion is oriented as illustrated in FIG. 2B.

A wireless device according to embodiments of the invention may be configured with two or more antennas that each emit electromagnetic radiation in substantially different directions when activated, and the control system of the wireless device may be configured to selectively activate each antenna depending on the orientation of the transmitting portion in order to control and limit user irradiation. According to some embodiments, the control system may also be configured to control the amount of power supplied to each antenna. A control system according to embodiments of the invention may be configured to supply less power to each one of or completely deactivate one or more of the one or more antennas of the wireless device depending on the orientation of the transmitting portion in order to limit user irradiation by the one or more antennas to below predetermined levels. User irradiation limits may be prescribed by regulations and may be different for different parts or regions of a user's body. For example, low irradiation limits may be prescribed for the head and a number of other organs.

The radiation pattern of an antenna specifies the dependence of the intensity of electromagnetic radiation emitted by the antenna on direction, distance, and optionally polarization. The intensity of the electromagnetic radiation at a specific position relative to an antenna and in a specific direction substantially depends on the configuration of the antenna, the frequency of the drive current, and the power supplied to the antenna. Typically, the intensity of the emitted electromagnetic radiation increases with increasing supplied power. According to embodiments of the invention, one or more of the antennas may be configured to exhibit a predetermined relationship between supplied power and intensity of the emitted electromagnetic radiation. Intensity of emitted radiation may also generally decrease with distance from an antenna, for example when the antenna is radiating substantially in free space. The radiation pattern may also depend on other factors, such as presence of a ground plane or other electromagnetically reflective or interactive objects, relationship between antenna dimensions and operating frequencies, interference patterns of plural antennas, and the like.

A wireless device according to embodiments of the invention may be controlled so that its radiation pattern may approximately assume a combination of the radiation patterns of the activated antennas. Depending on the embodiment and for as long as other elements do not cause substantial interference, the radiation pattern of the wireless device may be affected, for example, by the superposition of the radiation patterns of the activated antennas weighted by the power supplied to each activated antenna.

Wireless devices according to some embodiments, however, may exhibit radiation patterns that may approximate or deviate from a linear superposition of the radiation patterns of the individual antennas to different degrees and depending on the specific activated antennas. Depending on the embodiment, for example, a substantially nonlinear superposition may occur because of cross talk between antennas and/or subsystems of a wireless device that are used for supplying and/or controlling power to the antennas, or other aspects of the wireless device. Furthermore, a control system according to some embodiments of the invention may be configured to control power supplied to two or more antennas in a substantially dependent manner.

Transmitting Portion

The transmitting portion includes one or more antennas characterized by one or more radiation patterns. According to embodiments, the orientation of the transmitting portion is used to control the power supplied to each of its antennas. Depending on the embodiment, the orientation of the transmitting portion may correspond with or be at least partially independent from the orientation of the wireless device.

According to embodiments of the invention, the transmitting portion and the wireless device are mechanically and electrically operatively interconnected. According to some embodiments, the transmitting portion is configured as an integral portion of the wireless device. According to embodiments, the mechanical interconnection may provide a resiliently biased articulating joint so that the orientation of the transmitting portion may be at least partially adjustable relative to the wireless device. According to some embodiments, the mechanical interconnection may be provided by one or more friction hinges or detent mechanisms, for example. A number of detent mechanisms and other mechanical systems providing a resiliently biased movable connection that enable adjustment about one or more angular axes would be readily known by a worker skilled in the art.

According to embodiments, the transmitting portion is movably connected, via a mechanical interconnection, to another portion of the wireless device or to another body such as a host laptop, handset or the like. The mechanical interconnection is coupled on one side to a portion of the wireless device including the transmitting portion, and on another side to a body which may be assumed to have a predetermined orientation relative to a user. For example, a typical type of laptop connected to a USB wireless adapter-type communication device may be assumed to be oriented such that the laptop keyboard is horizontal relative to the user, with the USB port extending horizontally from the side of the laptop.

According to embodiments, the transmitting portion comprises two or more sub-portions movable relative to each other. For example, each sub-portion may comprise an antenna, or one or more sub-portions may comprise an electromagnetic body such as a reflector. By moving sub-portions of the transmitting portion relative to each other, the radiation patterns of one or more antennas may be adjusted.

According to some embodiments, the mechanical interconnection may be provided by mechanisms such as a friction hinge, ball joint such as a ball and cup joint, universal joint, bearing assembly, plastically deformable housing, or a segmented body comprising a series of mechanisms such as listed above.

According to some embodiments of the invention, the transmitting portion may comprise additional elements that affect the propagation of electromagnetic radiation emitted from the one or more antennas. For example, the transmitting portion may comprise a housing or one or more shields or reflectors for blocking or directing electromagnetic radiation.

A transmitting portion according to embodiments of the invention may include drive circuitry for driving and powering the antennas. One or more of the antennas in the transmitting portion may be used also for reception of electromagnetic signals and the transmitting portion may include corresponding circuitry for receipt and processing of incoming signals. A transmitting portion according to some embodiments may include a sensor system including one or more sensors for sensing the orientation of the transmitting portion.

Figure 3A:
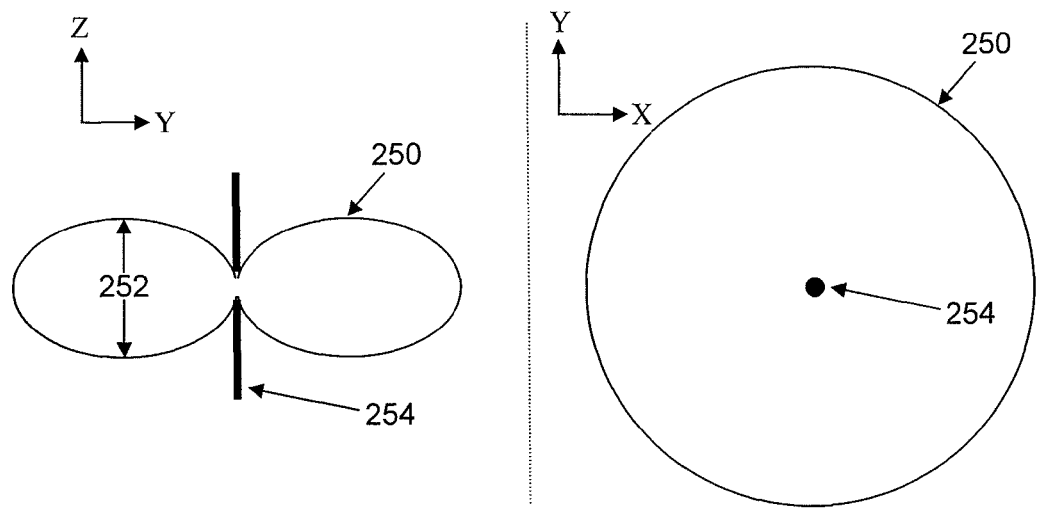
FIGS. 3A, 3B and 3C illustrate antenna radiation patterns according to some embodiments of the invention.
Figure 3B:
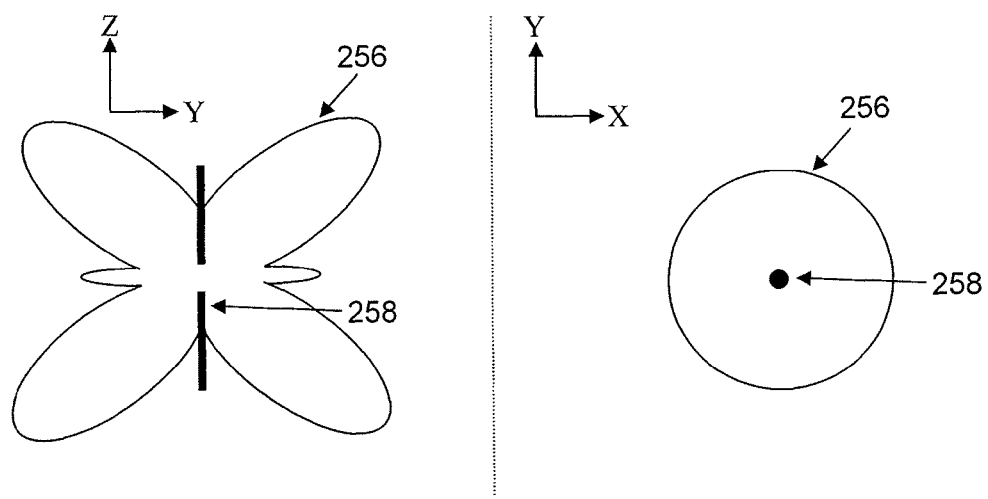
Figure 3C:
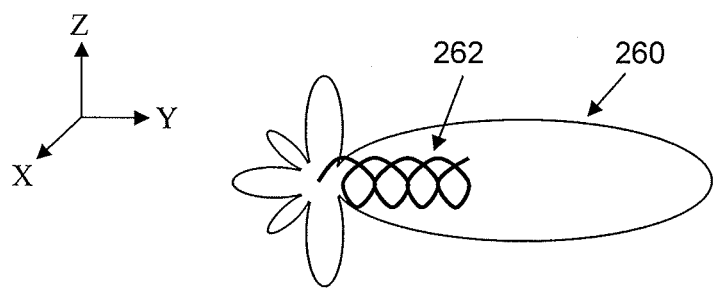

FIGS. 3A to 3C illustrate example radiation patterns of basic antenna types. These antenna types are not intended to be limiting, as other antennas such as patch antennas, planar inverted F-antennas (PIFAs), aperture antennas, and other antenna types may be preferable as antennas providing performance requirements of the wireless device such as compactness, sufficient bandwidth, and frequency of operation. The illustrated radiation patterns demonstrate that antenna radiation patterns are typically not omnidirectional, thus the antenna may be advantageously oriented relative to a user such that relatively less radiation is absorbed by the user, in accordance with the present invention. The illustrated radiation patterns may be viewed, for example, as illustrating one or more lines or surfaces representing constant radiated power at a predetermined location relative to the antenna.

FIG. 3A illustrates the radiation pattern 250 for a dipole antenna 254 having a length substantially equal to half a wavelength of transmitted radiation. The radiation pattern can be generally described as broadside toroidal with relatively low directivity. The radiation pattern 250 is illustrated cross-sectionally in the Y-Z plane containing the antenna 254 and in the X-Y plane passing midway through the antenna 254 along its main axis.

By increasing the length of the dipole, the width 252 of the main lobes in the Z-axis direction may be reduced, thereby increasing directivity. However, at a length greater than about 1.3 times the wavelength, significant sidelobes emerge which may cause radiation in undesired directions.

FIG. 3B illustrates the radiation pattern 256 for a dipole antenna 258 having a length substantially equal to 1.6 times a wavelength of transmitted radiation. The radiation pattern 256 is illustrated cross-sectionally in the Y-Z plane containing the antenna 258 and in the X-Y plane passing midway through the antenna 258 along its main axis. As illustrated, the main lobes illustrated in FIG. 3A have significantly collapsed, and new lobes are present in directions substantially diagonal to the antenna body.

FIG. 3C illustrates the radiation pattern 260 for an axial mode helical antenna 262 having a diameter of about $\lambda/\pi$, and a spacing between the three or more loops of about $\lambda/4$, where $\lambda$ is the radiation wavelength. The radiation pattern 260 is generally symmetric with rotation about the Y-axis. The axial mode helix exhibits a single main lobe with relatively high directivity.

Sensor System

The sensor system is used for determining an orientation of the one or more antennas of the transmitting portion of the wireless device. The sensor system comprises one or more sensors that can provide one or more sensor signals which are at least indicative of the orientation of the one or more antennas and/or the transmitting portion. Orientation may refer for example to relative orientation between relatively movable portions of the wireless device, relative orientation between antennas and a user, handset body or laptop body, or relative orientation between antennas and a reference such as Earth gravity, for example. The one or more sensor signals are provided to the control system for use in the determination of power supplied to each antenna in correspondence with the orientation of the transmitting portion.

According to some embodiments, the sensor system is used to provide one or more signals indicative of the alignment of the antennas and hence the alignment of the radiation patterns of the antennas. Information about the orientation of the antennas may be determined using sensors configured to sense the orientation of the transmitting portion, or inferred from signals provided by sensors sensing the orientation of the wireless device. This information can be used by the control system for further processing in order to control the radiation pattern of the wireless device at least in part relative to the alignment and position of a user.

The sensor system comprises at least one sensor for determining an orientation of at least the transmitting portion. According to some embodiments, the sensor system may be configured to sense the orientation of a predetermined axis of the transmitting portion relative to at least one external reference axis, for example, a vertical reference axis in line with the gravitational field of the Earth. According to embodiments, the sensor system may be configured to sense the orientations of a first axis and a second axis relative to an external reference axis, for example, two orthogonal axes of the transmitting portion relative to gravity. Sensing an orientation of two axes can enable the determination of the orientation of the transmitting portion in three dimensions.

A sensor system according to some embodiments includes one or more sensors disposed in the transmitting portion or at least in a fixed relationship with the transmitting portion so the sensors can sense the orientation of the transmitting portion directly. A sensor system according to embodiments includes one or more sensors disposed in a fixed relationship with a portion of the wireless device other than the transmitting portion or at least in a fixed relationship with that other portion so the sensors may be used to infer the orientation of the transmitting portion.

A sensor system may include a first sensor and a second sensor which are configured so that the first sensor is disposed in or in a fixed relationship with the transmitting portion and is used to sense an orientation of a first axis of the transmitting portion while the second sensor is disposed in or in a fixed relationship with a portion of the wireless device other than the transmitting portion and used to sense an orientation of a second axis. The full orientation of the transmitting portion may then be inferred from the sensor signal of the second sensor, for example, if the wireless device is configured so that the second axis is in a fixed relationship with the transmitting portion irrespective of the orientation of the transmitting portion with respect to the rest of the wireless device.

A sensor system according to some embodiments can be configured to provide one or more signals indicative of the orientation of one or more axes of the transmitting portion with a predetermined resolution. According to some embodiments, the sensor system may be configured to discriminate between two or more orientations per axis. The sensor system may be configured to process the signals and provide the signals in a digital or analog format for further processing by the control system.

According to embodiments, each of the one or more sensors of a sensor system may comprise one or more axis micro-electromechanical (MEMS) accelerometers, an electrolytic liquid, mercury, rolling ball, pendulum or potentiometer sensor with electrical, capacitive or optical sensing of the moving body, one or more proximity sensors, mechanical sensors, piezoelectric sensors, for example, or other sensor which is capable of sensing orientation/tilt as would be readily understood by a person skilled in the art. A sensor system according to embodiments of the invention comprises a three-axis MEMS that is operatively coupled to the control system. A sensor system according to some embodiments comprises a linear or rotary potentiometer, which is configured to provide a varying electrical signal indicative of a position of a mechanical interconnection mechanism of the wireless device. A sensor system according to embodiments comprises an absolute or relative optical rotary encoder, which is configured to provide a varying electrical signal indicative of a position of a rotating mechanical interconnection mechanism of the wireless device.

A sensor system according to some embodiments of the invention may include one or more sensors configured to provide one or more signals indicative of an orientation relative to a predetermined part of the wireless device. For example a sensor may indicate an orientation of one part relative to another part of an articulated joint of the wireless device. In some embodiments, the sensor system may comprise one or more switches integrated into an articulated joint, for example a hinge. The switches may be configured to open and close in correspondence with predetermined angular configurations of the articulated joint. For example, a switch in a hinge may be configured to open or close when the hinge is open more than 45 degrees. According to embodiments, one or more sensors may be included in the sensor system that can indicate an orientation relative to one or more external axes. For example a sensor may indicate an orientation relative to gravity.

Control System

A control system of a wireless device according to embodiments of the invention may be used to control power supplied to the one or more antennas of the wireless device depending on the orientation of the antennas. Information that indicates or can be used to determine the orientation of the antennas is provided to the control system by the sensor system to which the control system is operatively coupled. The control system is configured to control, at least in part, the strength of the electromagnetic radiation emitted from the transmitting portion in certain directions by controlling how much power is supplied for wireless transmission purposes to each antenna and determines how much power is to be provided based on information about the orientation of the transmitting portion. A control system of a wireless device according to some embodiments may be configured to selectively activate the one or more antennas for transmission depending on the orientation. Selective activation may be performed in a manner which causes radiation intensity at the actual or expected location of a user to be restricted to a level which causes an acceptably low SAR for the user.

In some embodiments, antennas are selectively activated such that at least one transmitting antenna is operable whenever possible, while deactivating transmitting antennas which would be expected to cause high SAR in a user due to their radiation patterns and orientations relative to the user. In embodiments of the invention, arrays of antennas are selectively activated, and operated with relative powers and/or waveform phases, such that the resulting radiation pattern of the array causes an acceptably low SAR in an actual or expected location of a user. Details of such joint operation of antennas as an array to provide an overall radiation pattern, for example by beamforming, would be understood by a worker skilled in the art.

According to some embodiments of the invention the control system may be configured to directly or, in combination with other drive circuitry, indirectly drive and provide power to the one or more antennas. The control system may further be configured to control the generation of signals for transmission to enable wireless communication of information via the antennas. According to embodiments, the control system may be configured to generate control signals indicative of the power to be used for wireless communication wherein the signals are forwarded for processing by a signal generation system controlling the wireless communication.

A control system of a wireless device according to embodiments of the invention may be further configured to control receipt of electromagnetic signals. For example, the control system may be configured to selectively process signals provided by each antenna of the wireless device in response to received electromagnetic radiation for incoming communication independently of whether the corresponding antenna is used to transmit an electromagnetic signal for transmission purposes.

A control system of a wireless device according to some embodiments of the invention may be configured as a purely analog or purely digital or a mixed analog and digital system and process corresponding signals that are incoming, outgoing as well as internal to the control system accordingly. The control system may be configured to use firmware, software, hardware or combination thereof in the control of the operation of the wireless device. Software may be provided in the form of a computer program product comprising a computer readable medium having program instructions recorded thereon for execution by a general-purpose or special-purpose computer processor.

A control system according to some embodiments of the invention may be configured to respond to predetermined externally provided signals or data, for example, certain signals or data provided wirelessly or via an interconnect system of the wireless device from an interconnected computer. External signals for the control of the wireless device may be generated using software that is used externally, for example, by an interconnected computer. Such software may be used, at least in part, to communicate, interact with, control, or query status information from the wireless device. The wireless device may be configured to provide software for the control of at least a portion of the function of the wireless device using such software. The wireless device may also be configured to provide at least a portion of such software.

A control system of a wireless device according to some embodiments of the invention may include a facility for calibration thereof. For example, a digital control system may be operable in a calibration mode wherein a user enters information regarding typical orientation of the wireless device with respect to the user, or wherein characteristics related to antenna radiation patterns are obtained or measured. This calibration mode may be used to adjust characteristics of control system behaviour, such as how power is supplied to antennas as orientation of the transmitting portion varies. In some embodiments, the wireless device is a USB wireless adapter for use with a laptop computer, and the user specifies the location and orientation of USB ports on the laptop computer. The control system may be configured to control aspects of antenna radiation patterns so as to reduce SAR to the user in light of the specified calibration information. In some embodiments, calibration includes measuring electromagnetic radiation indicative of antenna radiation patterns, for example via a radio receiver or sensor. This may enable the control system to adapt to changes in radiation patterns for example due to proximity to a ground plane or other object, or even a user's body. This may enable further reduction of SAR to a user.

A control system of a wireless device according to embodiments of the invention may comprise portions closely coupled or even integral to the sensor system or mechanical interconnection. A mechanically actuated electrical contact may be operatively coupled to at least one antenna. The mechanically actuated electrical contact may then be mechanically responsive to motion of an articulated joint to operate said contact between an open position and a closed position. For example, in some embodiments, an electrical path providing power to one or more antennas of the transmitting portion may be routed through an electrical contact. The electrical contact may be mechanically and electrically disconnected when a mechanical interconnection facilitating relative movement of the transmitting portion is moved between a first position and a second position. Thus, when the transmitting portion is moved to a position which might be associated with increased SAR, one or more antennas may be operable at reduced power, or even rendered inoperable by a mechanical disconnect.

The invention will now be described with reference to specific examples. It will be understood that the following examples are intended to describe embodiments of the invention and are not intended to limit the invention in any way.

EXAMPLES

Example 1

Figure 4:
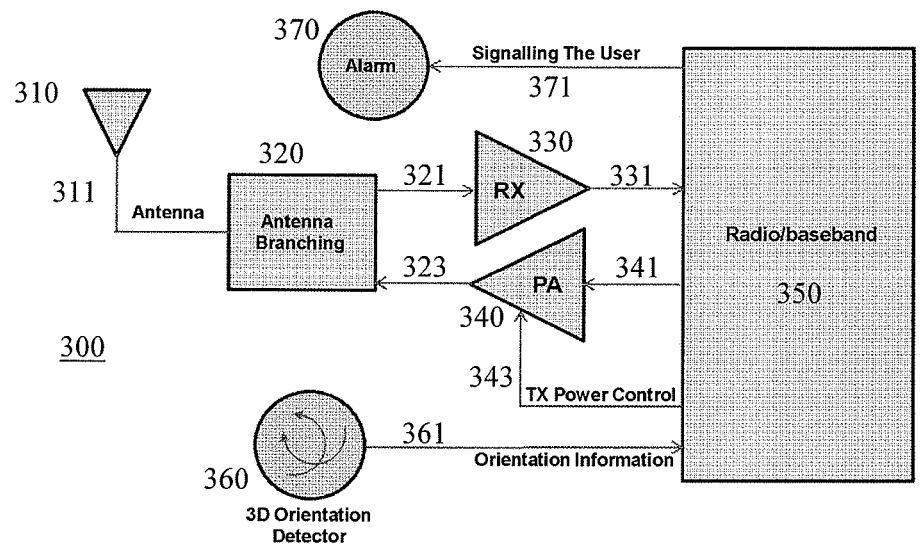
FIG. 4 illustrates a block diagram of a wireless device according to some embodiments of the invention.

FIG. 4 illustrates a block diagram of a wireless device 300 showing components and interactions according to embodiments of the invention. The wireless device comprises an antenna 310, a branching circuit 320 for separating incoming signals 321 from outgoing signals 323 that have been received or are to be transmitted via the antenna 310, an incoming signal amplifier 330, an outgoing signal amplifier 340, a radio baseband controller 350, an orientation sensor 360 and a user notification element 370 for indicating a predetermined user notification such as an alarm indicating predetermined SAR levels, for example. The antenna 310 is used to receive as well as transmit electromagnetic signals in a wireless manner over the air using electromagnetic radiation which may lead to user irradiation which may be quantified in terms of SAR as described above.

The antenna 310 is operatively connected 311 to the branching circuit 320. The branching circuit 320 includes antenna drive circuitry (not illustrated) for providing a drive signal to the antenna 310 and which includes branching circuitry (not illustrated) for separating electromagnetic signals received via the antenna 310. The branching circuit 320 is operatively coupled 321 to the incoming signal amplifier 330 for forwarding incoming signals to the incoming signal amplifier 330. The branching circuit 320 is also operatively coupled 323 to the outgoing signal amplifier 340 for forwarding outgoing signals to the antenna 310.

The incoming signal amplifier 330 is operatively connected 331 to the radio baseband controller 350 for forwarding incoming signals to the latter. The outgoing signal amplifier 340 is operatively connected 341 to the radio baseband controller 350 for receiving outgoing signals from the latter. The outgoing signal amplifier 340 is also operatively coupled to the radio baseband controller 350 for receiving a transmission power control signal 343 for controlling the amplification of the outgoing signal amplifier 340.

The radio baseband controller 350 is operatively connected 361 to the orientation sensor 360 for receiving one or more signals indicating the orientation of the transmitting portion of the wireless device (not illustrated). The radio baseband controller 350 is further operatively connected 371 to the user notification element 370 for generating or controlling activation of the predetermined user notification. The user notification element 370 may be provided via a user interface of the wireless device or an interconnected computer (not illustrated) or both, for example. The user notification element 370 may be configured to provide an optical or an acoustical indication or both, for example.

The radio baseband controller 350 is configured to control the operation of the wireless device. According to the embodiment, the radio baseband controller 350 is configured to control power supplied to the antenna 310 for transmitting purposes depending on the orientation of the antenna 310. For this purpose, the antenna 310 is configured to provide a predetermined radiation pattern when activated and the orientation sensor 360 is configured to provide an indication of the orientation of the antenna 310 to the radio baseband controller 350 which in turn is configured to determine a limit for the power to be supplied to the antenna 310 so that irradiation of a user who is assumed to be at a predetermined distance and orientation relative to the wireless device remains below a predetermined level. Specifically, the radio baseband controller 350 may be configured to determine an upper limit for the power that can be provided to the antenna while not exceeding a predetermined SAR limit.

The wireless device is configured so that the radio baseband controller 350 provides a transmission power control signal 343 for controlling the amplification of the outgoing signal amplifier 340. The outgoing signal amplifier 340 amplifies the outgoing signals provided via operative connection 341 in accordance with the transmission power control signal 343 and provides the amplified signal via operative connection 323 to the branching circuit 320. The radio baseband controller 350 is further configured to process incoming signals provided via operative connection 331 in order to provide for incoming communications.

The orientation sensor 360 of the wireless device according to this embodiment is configured as a three dimensional (3D) orientation sensor, for example, a 3D MEMS orientation sensor which can discriminate the orientation of three predetermined axes relative to gravitation. The orientation sensor 360 may be further configured to provide one or more signals indicating an orientation of one or more of the three axes. Likewise, the radio baseband controller 350 may be configured to process one, two or all three orientations for further processing.

FIGS. 5A to 5E each illustrate different views and configurations of an example wireless device 400. The wireless device 400 may internally work as described with reference to block diagram 300 as illustrated in FIG. 4, for example. The wireless device 400 comprises a three-axis articulated joint 430 that mechanically and electrically operatively interconnects the transmitting portion 410 and the interconnect portion 420 of the wireless device. The wireless device is further configured with a universal serial bus interface 425 and a corresponding connector via interconnect portion 420 for interconnecting the wireless device 400 to a corresponding interface of a computer, for example.

Figure 5A:
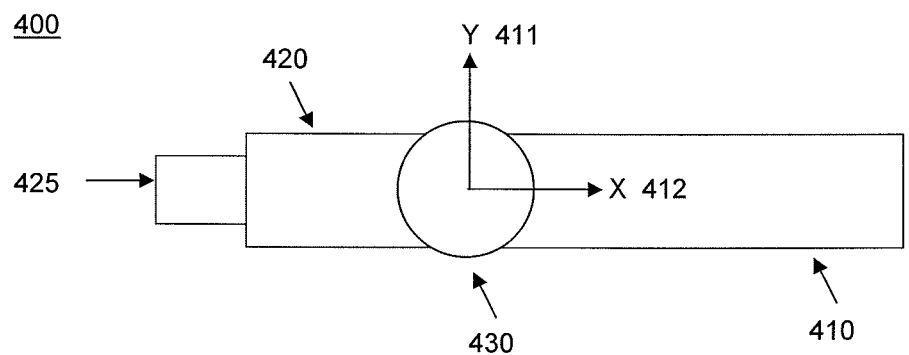
FIG. 5A illustrates a plan view of a first straight configuration of a wireless device according to an embodiment of the invention.
Figure 5B:
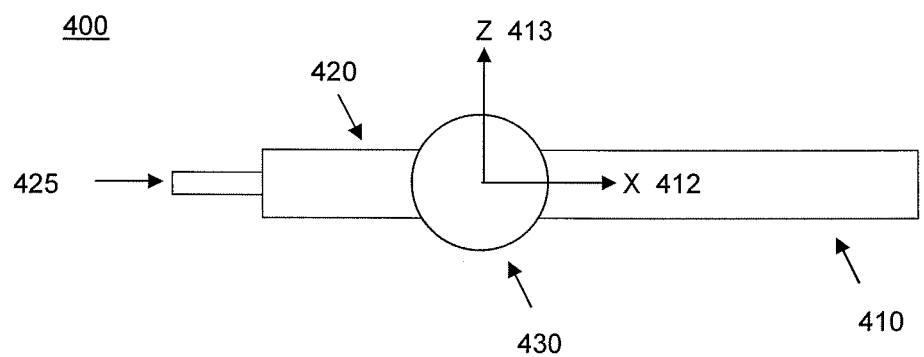
FIG. 5B illustrates a side view of the first straight configuration of the wireless device of FIG. 5A.
Figure 5C:
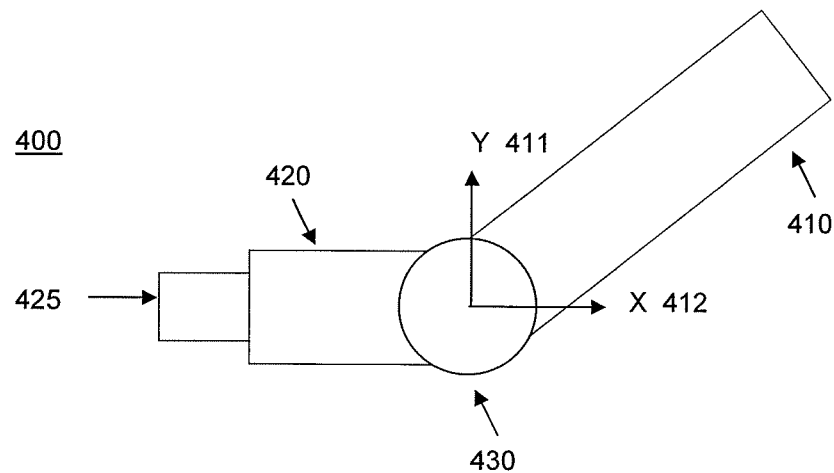
FIG. 5C illustrates a plan view of a bent configuration of the wireless device of FIG. 5A, wherein the transmitting portion is rotated about the Z-axis.
Figure 5D:
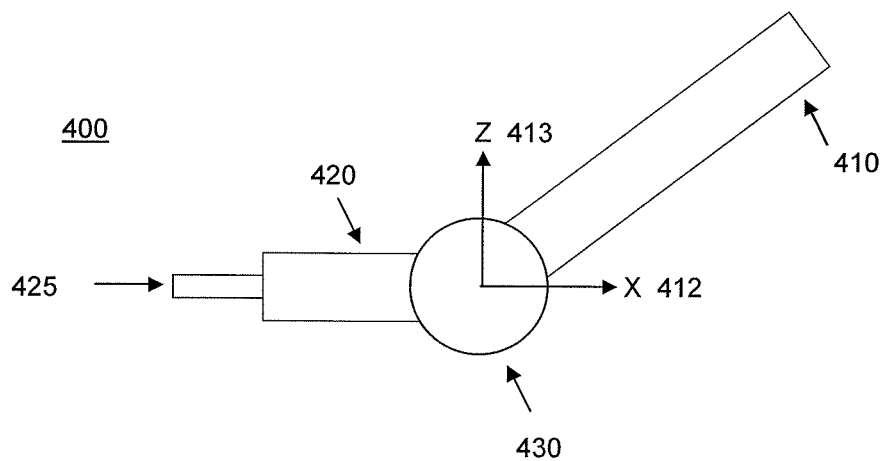
FIG. 5D illustrates a side view of a bent configuration of the wireless device illustrated in FIG. 5A, wherein the transmitting portion is rotated about the Y-axis.
Figure 5E:
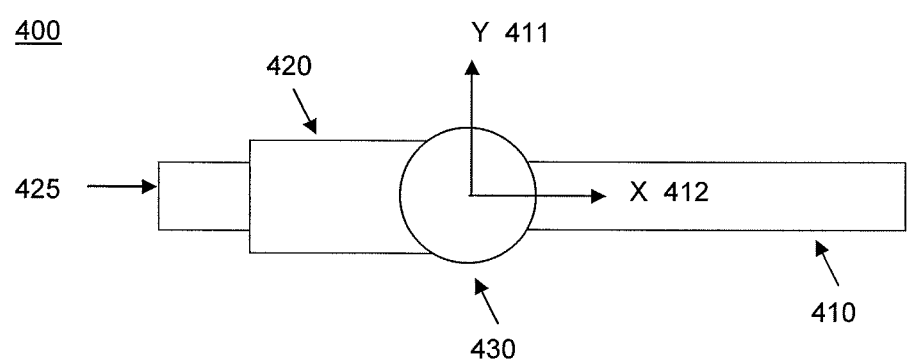
FIG. 5E illustrates a plan view of a second straight configuration of the wireless device of FIG. 5A, wherein the transmitting portion is rotated about the X-axis.

FIG. 5A illustrates a plan view of the wireless device 400 in a straight configuration with the transmitting portion 410 assuming a first orientation relative to three mutually perpendicular axes: the X-axis 412, Y-axis 411 and Z-axis 413 of the three-axis articulated joint 430 with the interconnect portion 420. FIG. 5B illustrates a side view of the wireless device 400 also in the straight configuration. FIG. 5C illustrates a plan view of the wireless device 400 in a bent configuration, wherein the transmitting portion 410 has been rotated relative to the interconnect portion 420 about the Z-axis. FIG. 5D illustrates a side view of the wireless device 400 in a bent configuration, wherein the transmitting portion 410 has been rotated relative to the interconnect portion 420 about the Y-axis. FIG. 5E illustrates a plan view of the wireless device 400 in a straight configuration, wherein the transmitting portion 410 has been rotated relative to the interconnect portion 420 about the X-axis.

Example 2

Figure 6:
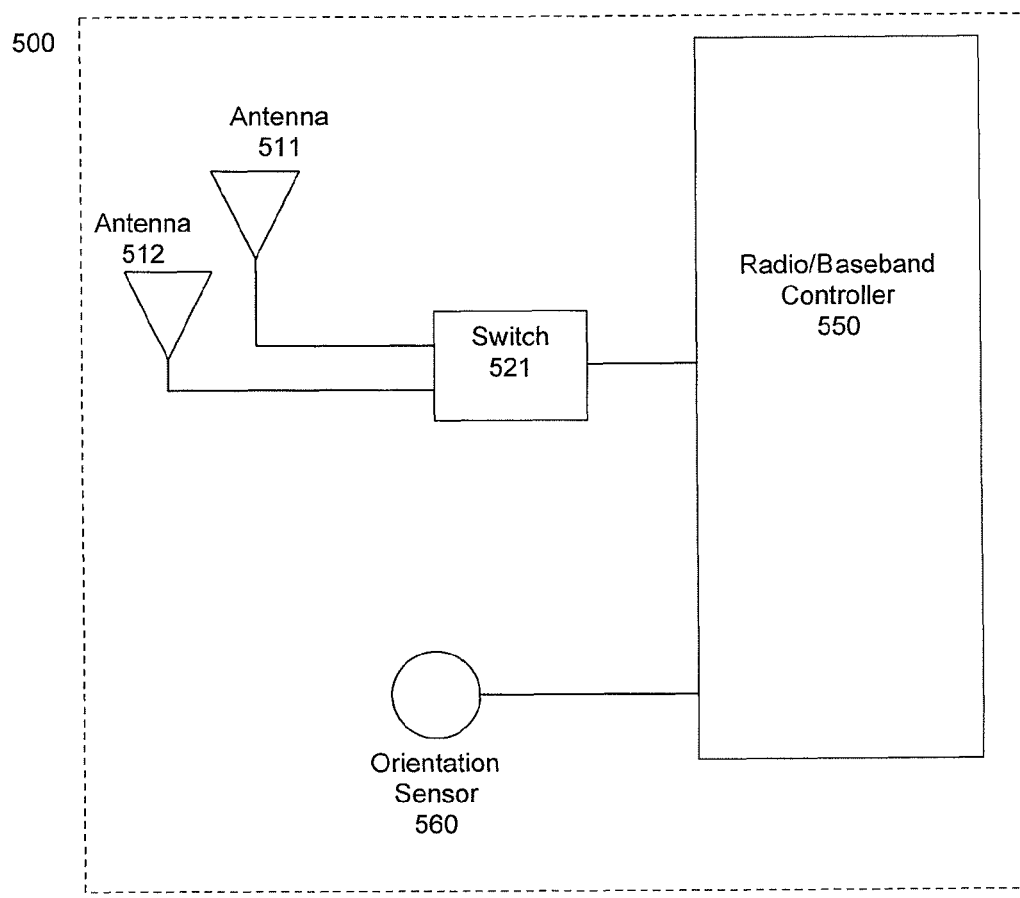
FIG. 6 illustrates a block diagram of a wireless device according to some embodiments of the invention.

FIG. 6 illustrates a block diagram of a wireless device 500 according to another embodiment of the present invention. The wireless device comprises a radio baseband controller 550, an orientation sensor 560. The wireless device further comprises a switching device 521, which is configured to operatively activate the first antenna 511 and the second antenna 512. The radio baseband controller 550 can selectively operate the switching device 521 to select one of or both of the antennas 511 and 512 for operation such that electromagnetic radiation which may lead to user irradiation can be controlled such that a predetermined SAR level may be satisfied.

The first and second antennas 511 and 512 can be configured to have different radiation patterns, power levels orientations, wherein the radio baseband controller 550, based on the known characteristics of the antennas, and relative positioning of the one or more antennas provided by the orientation sensor 560, is configured to selectively drive these antennas via the switching device 521, in order to mitigate user irradiation. In this manner a desired SAR level may be achieved.

The switching device can be configured substantially as a device that provides a means for switching, for example a transistor, MOSFET, PIN diode switch, a controllable mechanical switch or other switching device as would be readily understood by a worker skilled in the art.

Example 3

Figure 7:
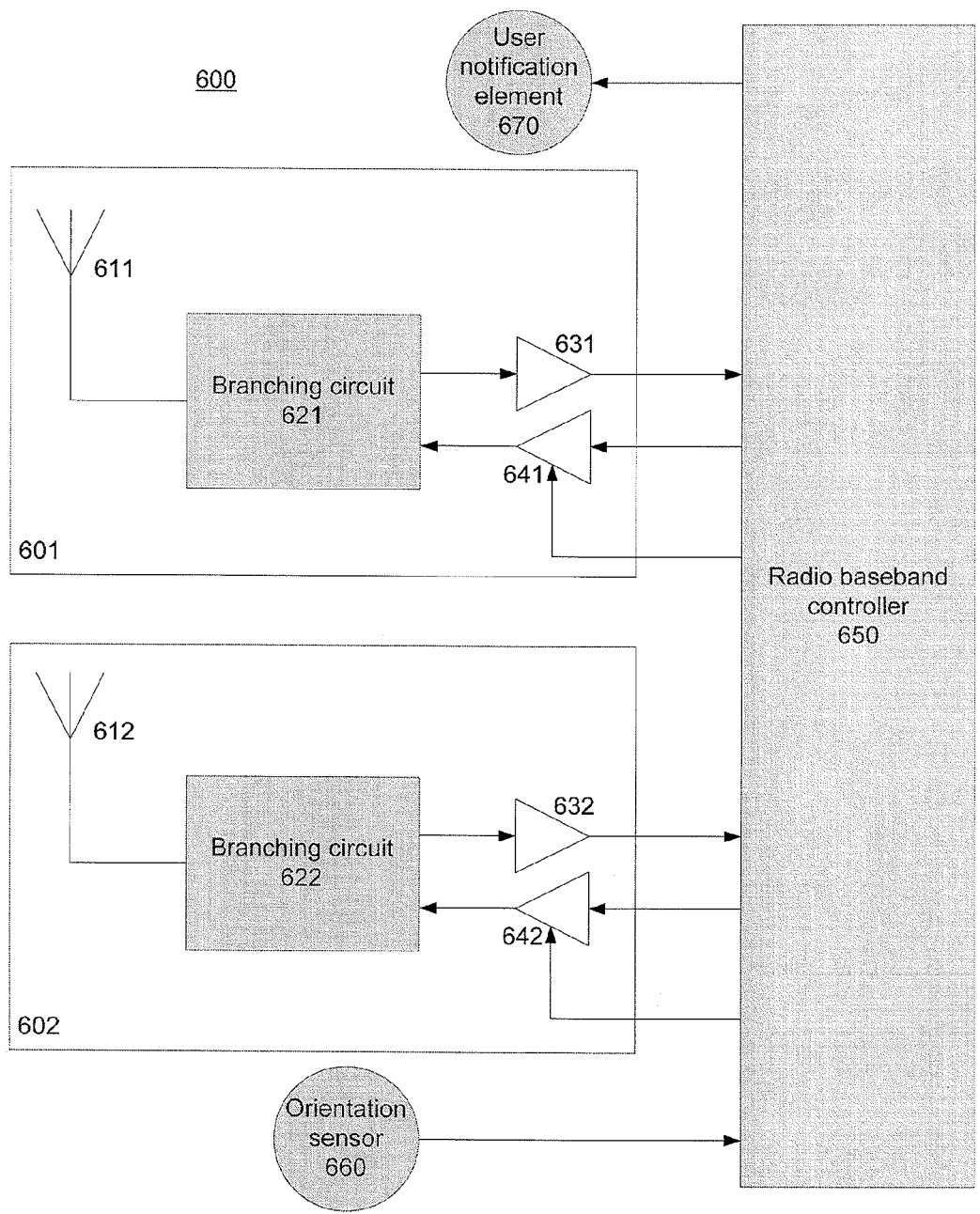
FIG. 7 illustrates a block diagram of a wireless device according to some embodiments of the invention.

FIG. 7 illustrates a block diagram of a wireless device 600 according to another embodiment of the present invention. The wireless device comprises a first antenna drive circuit 601 and a second antenna drive circuit 602. Each antenna drive circuit includes respective branching circuits 621 and 622, incoming signal amplifiers 631 and 632 and outgoing signal amplifiers 641 and 642. The wireless device further comprises a radio baseband controller 650, an orientation sensor 660 and a user notification element 670. The wireless device may be configured to use the user notification element 670 for indicating a predetermined user notification, for example, an indication of predetermined communication quality or radiation exposure levels, for example. The antennas 611 and 612 may be used to receive as well as to transmit electromagnetic signals in a wireless manner over the air using electromagnetic radiation which may lead to user irradiation which may be quantified in terms of SAR as described above.

Each antenna drive circuit 601 and 602 is operatively interconnected with the radio baseband controller 650. For this purpose, the radio baseband controller 650 is configured to provide separate interconnections for each antenna drive circuit 601 or 602. Each antenna drive circuit 601 or 602 is operatively interconnected with respective interconnections provided by the radio baseband controller 650 for the respective antenna drive circuit as respectively described in Example 1. The internal components of each antenna drive circuit 601 or 602 are operatively interconnected as respectively outlined in Example 1 above.

According to this embodiment, the outgoing signal amplifiers 641 and 642 are operatively connected to the radio baseband controller 650 for receiving outgoing signals from the latter that are separate and may be independent from the outgoing signal for the other outgoing signal amplifier. Each outgoing signal amplifier 641 and 642 is also separately operatively coupled to the radio baseband controller 650 for receiving a respective transmission power control signal for controlling the amplification of the respective outgoing signal amplifiers 641 and 642 separately.

The radio baseband controller 650 is operatively connected to the orientation sensor 660 for receiving one or more signals indicating the orientation of the transmitting portion of the wireless device (not illustrated). The radio baseband controller 650 is further operatively connected to the user notification element 670 for generating or controlling activation of the predetermined user notification. The user notification element 670 may be provided via a user interface of the wireless device or an interconnected computer (not illustrated) or both, for example. The user notification element 670 may be configured to provide an optical or an acoustical indication or both, for example.

The radio baseband controller 650 is configured to control the operation of the wireless device. According to an embodiment of the present invention, the radio baseband controller 650 is configured to control separately the amount of power supplied to each of the antennas 611 and 612 for transmitting purposes depending on the orientation of the transmitting portion as sensed by the orientation sensor 660. For this purpose, each of the antennas 611 and 612 is configured to provide its own predetermined radiation pattern when activated and the orientation sensor 660 is configured to provide an indication of the orientation of the antennas 611 and 612 to the radio baseband controller 650 which in turn is configured to determine a limit for the power to be supplied to each of the antennas 611 and 612 so that irradiation of a user who is assumed to be at a predetermined distance and orientation relative to the wireless device remains below a predetermined level. Specifically, the radio baseband controller 650 may be configured to determine the antenna power limits using SAR. According to an embodiment of the present invention, different antennas with different radiation patterns may be employed in a wireless device. According to another embodiment differently aligned antennas with similar or nominally equal radiation patterns may be employed in a wireless device.

The wireless device is configured so that the radio baseband controller 650 provides separate transmission power control signals for controlling the amplification of the outgoing signal amplifiers 641 and 642 to the respective outgoing signal amplifier 641 or 642. The outgoing signal amplifiers 641 and 642 each amplify the outgoing signals provided via respective operative connections in accordance with respective transmission power control signals and provide the respective amplified signals via respective operative connections to the respective branching circuits 621 and 622. The radio baseband controller 650 is further configured to process respective incoming signals provided via respective operative connections in order to provide for incoming communications.

The orientation sensor 660 of the wireless device according to this embodiment may be configured as a three dimensional (3D) orientation sensor, for example, a 3D MEMS orientation sensor which can discriminate the orientation of three predetermined axes relative to gravitation. The orientation sensor 660 may be further configured to provide one or more signals indicating an orientation of one or more of the three axes. Likewise, the radio baseband controller 650 may be configured to process one, two or all three orientations for further processing.

The wireless device may further be configured as illustrated in FIG. 5A to FIG. 5E and described with reference to these Figures in Example 1 above.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A device for wireless communication comprising:
  a. a transmitting portion including one or more antennas characterized by one or more radiation patterns, each radiation pattern defining dependence of intensity of electromagnetic radiation generated by an antenna on direction and distance from the transmitting portion in correspondence with power supplied to the antenna;

b. a sensor system configured for determining a relative orientation between the transmitting portion and a reference orientation, the reference orientation indicative of one or more predetermined axes external to the device;

c. a control system operatively coupled to the transmitting portion and to the sensor system, wherein the control system is configured to selectively control the power supplied to the one or more antennas in correspondence with the determined relative orientation between the transmitting portion and the reference orientation; and d. an interconnect system configured to interconnect the device to a host computer system, said device configured as a peripheral device, wherein predetermined control of intensity of electromagnetic radiation emitted from the transmitting portion is provided in predetermined directions.

2. The device according to claim 1, wherein the power supplied to each antenna is controlled to assume one of two or more power levels at a time.

3. The device according to claim 1, wherein the control system is further configured to limit user irradiation caused by the electromagnetic radiation emitted from the transmitting portion.

4. The device according to claim 3, wherein the user irradiation is characterized by a specific absorption rate.

5. The device according to claim 1, wherein the sensor system is configured to discriminate between a plurality of orientations.

6. The device according to claim 5, wherein the sensor system includes one or more switches, the switches configured to provide signals to the control system for discrimination between two or more predetermined orientations.

7. The device according to claim 1, further comprising an articulated joint for adjustment of orientation of the transmitting portion.

8. The device according to claim 7, wherein the articulated joint provides one or more rotational axes each permitting at least partial angular adjustment.

9. The device according to claim 7, wherein the articulated joint includes one or more detent mechanisms.

10. The device according to claim 7, wherein the articulated joint includes one or more joints selected from the group comprising: friction hinges, ball joints, universal joints, bearing assemblies, and plastically deformable joints.

11. The device according to claim 7, wherein the control system includes a mechanically actuated electrical contact operatively coupled to at least one of the one or more antennas, the mechanically actuated electrical contact mechanically responsive to motion of the articulated joint to operate said contact between an open position and a closed position.

12. The device according to claim 1, wherein the host computer system is a mobile computer system.

13. The device according to claim 1, wherein the interconnect system comprises a universal serial bus interface, PC Card interface, or ExpressCard bus interface.

14. The device according to claim 1, wherein the device is configured as a wireless network modem, a cellular network modem, a satellite network modem, a wireless local area network modem, or a mobile phone.

15. The device according to claim 1, wherein the control system is further configured to jointly operate two or more antennas as an array to provide predetermined control of intensity of electromagnetic radiation emitted from the array in predetermined directions.

16. The device according to claim 1, wherein the control system is operable in a calibration mode for adjusting characteristics for selective control of power supplied to the one or more antennas in correspondence with the relative orientation of the transmitting portion.

17. The device according to claim 1, wherein the sensor system includes one or more sensors selected from the group comprising: MEMS sensors, electrolytic liquid sensors, mercury sensors, rolling ball sensors, pendulum sensors, or potentiometer sensors, proximity sensors, and piezoelectric sensors.

18. The device according to claim 1, wherein the transmitting portion rotates with respect to the interconnect system.

19. The device according to claim 1, wherein the control system includes a radio baseband controller.

20. A method for controlling a wireless communication device comprising a transmitting portion including one or more antennas characterized by one or more radiation patterns, each radiation pattern defining dependence of intensity of electromagnetic radiation generated by an antenna on direction and distance from the transmitting portion in correspondence with power supplied to the antenna, the method comprising:

a. interconnecting the wireless communication device to a host computer system, said wireless communication device configured as a peripheral device;

b. determining a relative orientation between the transmitting portion and a reference orientation, the reference orientations indicative of one or more predetermined axes external to the wireless communication device; and c. selectively controlling the power supplied to the cine or more antennas in correspondence with the determined relative orientation between the transmitting portion and the reference orientation;

wherein predetermined control of intensity of electromagnetic radiation emitted from the transmitting portion is provided in predetermined directions.

21. The method according to claim 20, wherein the power supplied to each antenna is controlled to assume one of two or more power levels at a time.

22. The method according to claim 20, wherein the predetermined control of intensity of electromagnetic radiation limits user irradiation caused by electromagnetic radiation emitted from the transmitting portion.

23. The method according to claim 20, wherein the wireless communication device comprises an articulated joint for adjustment of orientation of the transmitting portion.

24. The method according to claim 20, further comprising the step of jointly operating two or more antennas as an array to provide predetermined control of intensity of electromagnetic radiation emitted from the array in predetermined directions.

25. The method according to claim 20, further comprising the step of calibrating characteristics for selective control of power supplied to the one or more antennas in correspondence with the orientation of the transmitting portion.

26. The method according to claim 20, further comprising rotating the transmitting portion with respect to interconnection of the wireless communication device to the host computer system.

* * * * *

UNITED STATES PATENT AND TRADEMARK OFFICE
CERTIFICATE OF CORRECTION

PATENT NO. : 8,744,539 B2  Page 1 of 1
APPLICATION NO. : 12/719781
DATED : June 3, 2014
INVENTOR(S) : Pourseyed et al.

It is certified that error appears in the above-identified patent and that said Letters Patent is hereby corrected as shown below:

IN THE CLAIMS

CLAIM 20      Replace "cine" with "one"

Col. 16, Line 34

Signed and Sealed this
Fifth Day of August, 2014

Michelle K. Lee
*Deputy Director of the United States Patent and Trademark Office*